No. 726,825. PATENTED APR. 28, 1903.
R. F. C. RAMBEAUD.
COUPLING FOR RAILWAY WAGONS OR THE LIKE.
APPLICATION FILED JUNE 2, 1902.
NO MODEL. 3 SHEETS—SHEET 1.

No. 726,825. PATENTED APR. 28, 1903.
R. F. C. RAMBEAUD.
COUPLING FOR RAILWAY WAGONS OR THE LIKE.
APPLICATION FILED JUNE 2, 1902.
NO MODEL.
3 SHEETS—SHEET 2.

Witnesses.

Inventor
René François Charles Rambeaud
by J. F. Singer
Att'y.

No. 726,825. PATENTED APR. 28, 1903.
R. F. C. RAMBEAUD.
COUPLING FOR RAILWAY WAGONS OR THE LIKE.
APPLICATION FILED JUNE 2, 1902.
NO MODEL. 3 SHEETS—SHEET 3.
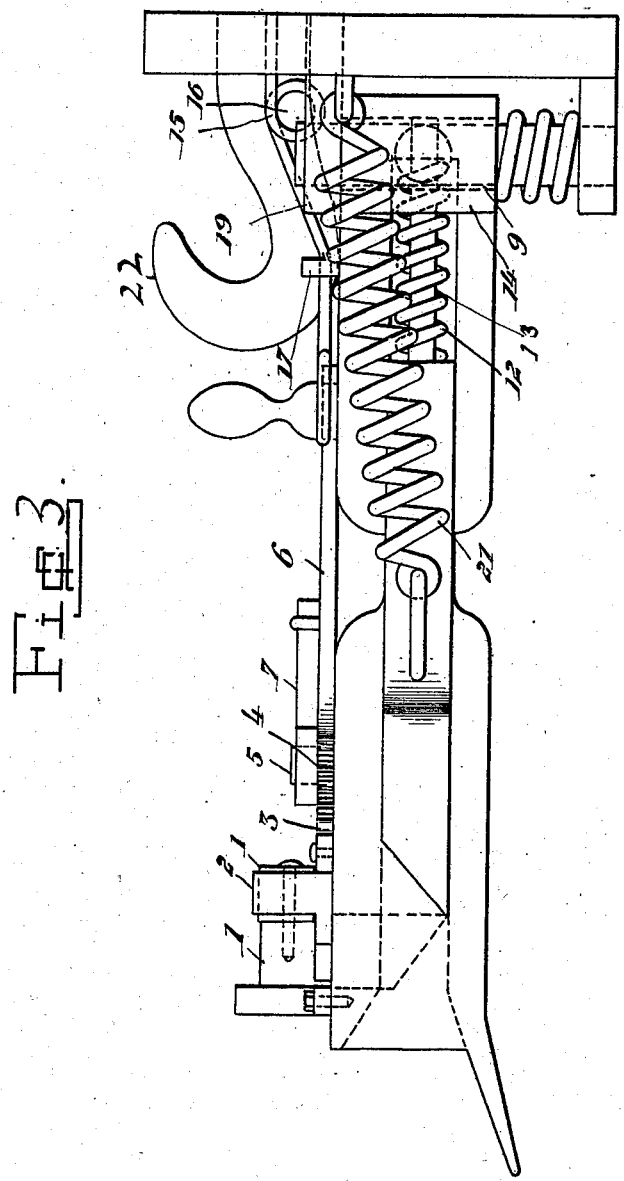

UNITED STATES PATENT OFFICE.

RENÉ FRANCOIS CHARLES RAMBEAUD, OF PARTHENAY, FRANCE.

COUPLING FOR RAILWAY-WAGONS OR THE LIKE.

SPECIFICATION forming part of Letters Patent No. 726,825, dated April 28, 1903.

Original application filed October 11, 1901, Serial No. 78,376. Divided and this application filed June 2, 1902. Serial No. 110,005. (No model.)

*To all whom it may concern:*

Be it known that I, RENÉ FRANCOIS CHARLES RAMBEAUD, a citizen of the French Republic, and a resident of Parthenay, Deux-Sèvres, France, have invented certain new and useful Improvements in Couplings for Railway-Wagons or the Like, of which the following is a specification.

This invention relates to an automatic coupling for railway-wagons and the like which operates automatically—that is to say, two wagons propelled one against the other will be forcibly coupled together. The safety-chains, if the law insists upon their usage, can be placed in position by the shunters without any danger or risk.

Figure 1:
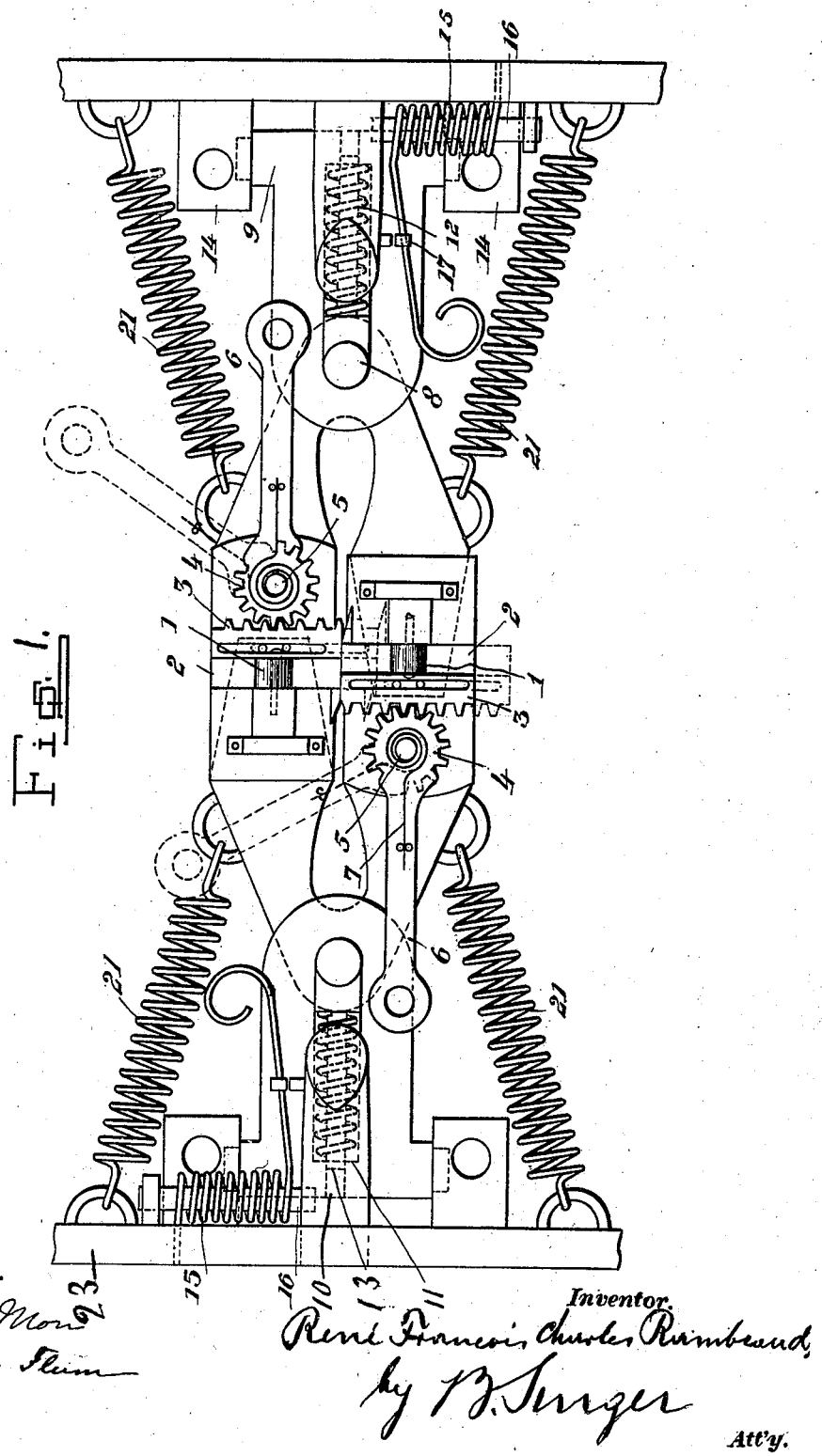
Figure 2:
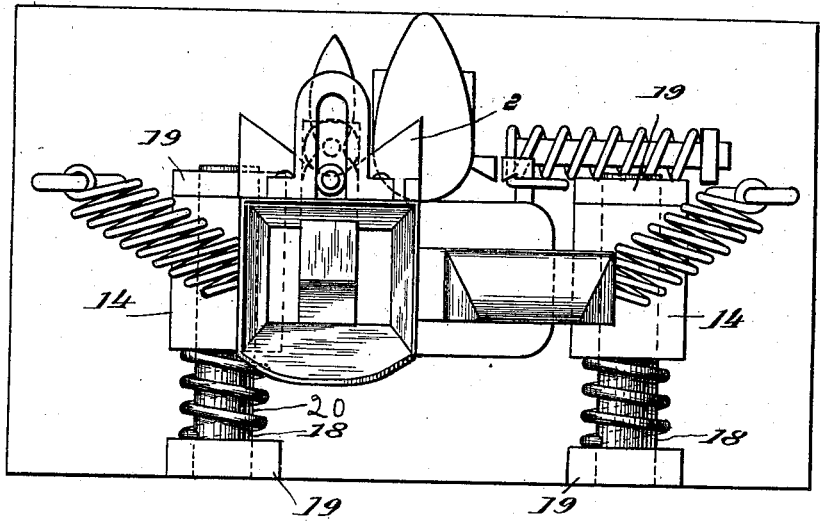

In the accompanying drawings, Figure 1 shows a plan view of this coupling. Fig. 2 shows an elevation of a half-coupling. Fig. 3 shows a side view of Fig. 2.

This application is a division of my prior application filed October 11, 1901, under Serial No. 78,376, and it relates to a different species of the invention, in which the racks $q$ are dispensed with.

This coupling is placed underneath the usual hook 22, serving for the chain attachment. When it is necessary to use my coupling, the frame or block 9 is connected to the wagon-frame 23 by means of a powerful spring 15, which passes under the hook 17. Each coupling-head is provided with a pin or tenon adapted to engage a link inserted in said head. Arranged in the upper part of each tenon is a roller 1, moving upon two inclined planes 2 in opposite directions to each other. By a simple movement of the inclined planes the rollers are compelled either to mount or to descend the inclined planes, and the tenons will consequently be lowered or raised accordingly. This movement of the inclined planes is effected by means of a rack 3, fixed to the said planes, and in which mesh the teeth of a toothed segment 4, pivoted at 5 and provided with a handle 6, being held in the closed position by means of a spring 7. The male and female parts are made in one piece pivoted at 8 to a block sliding in piece 9 and provided with a cylindrical portion 13, that is adapted to move in a groove 10 of a part 11. Around the cylindrical part 13 is wound a spiral spring 12, one end of which bears against the aforesaid sliding block, while the other end bears against the part 11, through which the passage 10 has been made to permit the portion 13 to slide therethrough. The part 9 is pivoted between two cheeks 14 14 and is maintained in the position for engagement by means of a spiral spring 15, fitted around a spindle 16. One end of this spring is attached to the cross-piece of the wagon, while the other engages a catch 17, placed on the part 9.

In order to allow wagons of different heights to be coupled together, the cheeks 14 are each provided with a hole placed vertical to the coupling and through which passes studs 18, fitted into two brackets 19, fixed to the aforesaid wagon cross-piece. A coiled spring 20 is placed around the studs 18 between the cheeks 14 and the lower bracket 19, so as to allow the coupling to retain any desired position. The couplings are further provided with coiled spring 21, so as to be maintained at right angles to the aforenamed wagon cross-piece.

Having thus described the invention, what is claimed, and desired to be secured by Letters Patent, is—

1. In a coupling for railway-cars and the like, the combination of a coupling-head, a pin or tenon carried by said head and adapted to engage a link inserted therein, a roller connected to the upper end of the pin, a cam mounted on the head and provided with a rack, a pivotally-mounted handle, and a segment connected to the handle and engaging said rack, whereby the cam may be moved transversely of the roller, beneath the same, to raise and lower the pin.

2. In a coupling for railway-cars and the like, the combination of a coupling-head, two oppositely-inclined cams mounted on the head, a rack connecting said cams, a pin adapted to engage a link inserted in the coupling-head and having at its upper end a roller that extends between said cams, a pivotally-mounted handle, and a segment connected to the handle and engaging said rack, whereby the cams may be shifted to raise and lower the pin.

3. In a coupling for railway-cars and the like, the combination of a slotted block pivotally connected to the car-frame to rock about a horizontal axis, a coupling-head having a vertical stud extending into the slot in said block and a coiled spring bearing at its ends against the coupling-head and the rear wall of the said slot.

4. In a coupling for railway-cars and the like the combination of a spring arranged close to the original coupling-hook, allowing by a simple push to disconnect the new system and to let it drop vertically; thus switching is facilitated and the accidental automatical coupling of the cars done away with moreover allowing of coupling two cars one of which is not provided with my system.

In testimony whereof I have hereunto set my hand in presence of two witnesses.

RENÉ FRANCOIS CHARLES RAMBEAUD.

Witnesses:
R. BEAUCHAMP,
FRANCOIS VIECER.